US012693486B2

(12) United States Patent
Xiong et al.

(10) Patent No.: US 12,693,486 B2
(45) Date of Patent: Jul. 28, 2026

(54) OPTICAL CABLE CONNECTION BOX AND ADAPTER

(71) Applicant: HUAWEI TECHNOLOGIES CO., LTD., Shenzhen (CN)

(72) Inventors: Wei Xiong, Shenzhen (CN); Bingjun Chen, Johannesburg (ZA); Zhijian Zhang, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 594 days.

(21) Appl. No.: 18/175,592

(22) Filed: Feb. 28, 2023

(65) Prior Publication Data

US 2023/0280561 A1 Sep. 7, 2023

Related U.S. Application Data

(63) Continuation of application No. PCT/CN2021/081920, filed on Mar. 19, 2021.

(30) Foreign Application Priority Data

Aug. 31, 2020 (CN) ......................... 202010899638.9
Aug. 31, 2020 (CN) ......................... 202021877984.9

(51) Int. Cl.
 *G02B 6/00* (2006.01)
 *G02B 6/38* (2006.01)
 *G02B 6/44* (2006.01)
(52) U.S. Cl.
 CPC ......... *G02B 6/4446* (2013.01); *G02B 6/3825* (2013.01)

(58) Field of Classification Search
 CPC .. G02B 6/4446; G02B 6/3825; G02B 6/3897; G02B 6/4441; G02B 6/00
 See application file for complete search history.

(56) References Cited

U.S. PATENT DOCUMENTS

| | | | | |
|---|---|---|---|---|
| 6,347,888 B1 * | 2/2002 | Puetz | ................... | G02B 6/3825 |
| | | | | 385/53 |
| 6,498,890 B1 * | 12/2002 | Kimminau | ............... | G02B 6/43 |
| | | | | 439/502 |
| 6,712,521 B1 * | 3/2004 | Koreeda | .............. | G02B 6/3885 |
| | | | | 385/63 |
| 2011/0085774 A1 * | 4/2011 | Murphy | ............... | G02B 6/3897 |
| | | | | 264/1.25 |

(Continued)

FOREIGN PATENT DOCUMENTS

| | | |
|---|---|---|
| CN | 101006375 A | 7/2007 |
| CN | 201319087 Y | 9/2009 |

(Continued)

*Primary Examiner* — Jennifer Doan

(57) ABSTRACT

Embodiments of this application disclose an optical cable connection box and an adapter, and belong to the field of optical cable connection technologies. The optical cable connection box includes a box body, at least one pair of adapters, and at least one optical fiber, and each adapter includes a first interface and a second interface that are opposite to each other; the at least one pair of adapters is located on the box body, the first interface of each adapter is located outside the box body, and the second interface of each adapter is located inside the box body; and the at least one optical fiber is located inside the box body and is connected between the second interfaces of each pair of adapters.

6 Claims, 8 Drawing Sheets

(56)                    References Cited

U.S. PATENT DOCUMENTS

| | | |
|---|---|---|
| 2017/0315304 A1 | 11/2017 | Lee et al. |
| 2021/0181443 A1* | 6/2021 | Zhou ................... G02B 6/4446 |

FOREIGN PATENT DOCUMENTS

| | | |
|---|---|---|
| CN | 102043206 A | 5/2011 |
| CN | 102841414 A | 12/2012 |
| CN | 104241938 A | 12/2014 |
| CN | 105223668 A | 1/2016 |
| CN | 205941993 U | 2/2017 |
| CN | 206671622 U | 11/2017 |
| CN | 206848539 U | 1/2018 |
| CN | 207181767 U | 4/2018 |
| CN | 207424330 U | 5/2018 |
| CN | 209215663 U | 8/2019 |
| CN | 112051643 A | 12/2020 |
| CN | 213023659 U | 4/2021 |
| JP | 2007140301 A * | 6/2007 |

* cited by examiner

OPTICAL CABLE CONNECTION BOX AND ADAPTER

CROSS-REFERENCE TO RELATED APPLICATIONS

This application is a continuation of International Application No. PCT/CN2021/081920, filed on Mar. 19, 2021, which claims priority to Chinese Patent Application No. 202010899638.9, filed on Aug. 31, 2020, and Chinese Patent Application No. 202021877984.9, filed on Aug. 31, 2020. All of the aforementioned patent applications are hereby incorporated by reference in their entireties.

TECHNICAL FIELD

This application relates to the field of optical cable connection technologies, and in particular, to an optical cable connection box.

BACKGROUND

With the development of optical fiber technologies, optical cables are widely used in communication. For example, an increasingly large quantity of users use optical fiber broadband to access the Internet. An optical fiber is led into a home by using a fiber access terminal (FAT).

For example, during initial network construction, a supplier may install a fiber access terminal on a communication pole in a residential area. When a user applies for a network access service, a drop fiber can be connected to a nearby fiber access terminal.

However, during initial network construction, the supplier needs to obtain a right to use the communication pole first, but a period of obtaining the right to use the communication pole is relatively long. This delays network construction progress and prolongs a period of fiber optic network deployment.

SUMMARY

Embodiments of this application provide an optical cable connection box and an adapter, to overcome a problem in a related technology that a period of fiber optic network deployment is relatively long during initial network construction. Technical solutions are as follows:

According to one aspect, an optical cable connection box is provided. The optical cable connection box includes a box body, at least one pair of adapters, and at least one optical fiber, and each adapter includes a first interface and a second interface that are opposite to each other; the at least one pair of adapters is located on the box body, the first interface of each adapter is located outside the box body, and the second interface of each adapter is located inside the box body; and the at least one optical fiber is located inside the box body and is connected between second interfaces of each pair of adapters.

The optical cable connection box may include at least one pair of adapters. For example, the optical cable connection box includes one pair of adapters. For another example, the optical cable connection box includes two pairs of adapters. A quantity of pairs of adapters is not limited in this embodiment, and one pair of adapters may be used as an example. One pair of adapters may include two adapters, and adapters may be respectively denoted as a first adapter and a second adapter.

In the solution described in this application, an optical cable located on a left side of the optical cable connection box and an optical cable located on a right side of the optical cable connection box are indirectly connected to each other by using a first adapter mounted on a left box wall of the box body, an optical fiber located inside the box body, and a second adapter mounted on a right box wall of the box body. For example, an optical fiber connector of the optical cable located on the left side of the optical cable connection box is inserted into a first interface of the first adapter on the left box wall, and an optical fiber connector of the optical cable located on the right side of the optical cable connection box is inserted into a first interface of the second adapter on the right box wall; and the first interface of the first adapter and the second interface of the second adapter are connected to each other by using the optical fiber, so that the optical cable located on the left side of the optical cable connection box and the optical cable located on the right side of the optical cable connection box are connected to each other by using the optical cable connection box.

In an embodiment, a quantity of optical fibers is related to a quantity of optical cables connected to the optical cable connection box and a quantity of optical fibers included in each optical cable.

In the solution described in this application, each side of the optical cable connection box is connected to n optical cables, and each optical cable includes m optical fibers. In this case, a quantity of optical fibers is m×n. For example, each side of the optical cable connection box is connected to one optical cable, and each optical cable includes two optical fibers. In this case, the quantity of optical fibers is two.

In an embodiment, each adapter is a multi-core adapter, the first interface includes a plurality of sockets, the second interface includes a plurality of sockets, and each pair of adapters includes a first adapter and a second adapter; and a first connector of each optical fiber is inserted into any socket of a second interface of the first adapter, and a second connector of each optical fiber is inserted into any socket of a second interface of the second adapter.

For example, a first optical cable located on the left side of the optical cable connection box includes two optical fibers, and the optical fibers are respectively denoted as an optical fiber 1 and an optical fiber 2, and a second optical cable located on the right side of the optical cable connection box includes two optical fibers, and the optical fibers are respectively denoted as an optical fiber 1 and an optical fiber 2. If a technician intends to connect the optical fiber 1 of the first optical cable to the optical fiber 1 of the second optical cable and connect the optical fiber 2 of the first optical cable to the optical fiber 2 of the second optical cable, two optical fibers located inside the box body 1 may be directly connected between the second interface of the first adapter and the second interface of the second adapter. If the technician intends to connect the optical fiber 1 of the first optical cable to the optical fiber 2 of the second optical cable and connect the optical fiber 2 of the first optical cable to the optical fiber 1 of the second optical cable, the two optical fibers located inside the box body may be connected between the second interface of the first adapter and the second interface of the second adapter in a crossed manner.

In an embodiment, two optical cables are indirectly connected to each other by using optical fibers, so that a line order of an optical fiber connection in an optical cable can be adjusted to improve use flexibility of the optical cable connection box.

In an embodiment, the at least one pair of adapters is located on a box wall of the box body.

In the solution described in this application, the adapters may be mounted on the box wall of the box body, may be mounted on a box cover of the box body, may be mounted on a box base of the box body, or the like.

According to another aspect, an adapter is provided. The adapter includes a first interface, a second interface, and a fixing flange. The first interface and the second interface are of a same structure and are located on both sides of the fixing flange.

The first interface and the second interface are of a same structure and are located on both sides of the fixing flange. For example, the first interface and the second interface may be symmetrical with respect to the fixing flange. Certainly, the first interface and the second interface may alternatively not be symmetrical with respect to the fixing flange. This is not limited in this embodiment, provided that the adapter can be connected to an optical fiber connector of an optical cable by using the first interface and the second interface.

In this way, in a scenario in which a network is being deployed but a right to use a current communication pole is not obtained, an optical cable that leads a previous communication pole to the current communication pole may be connected to the first interface of the adapter, and then an optical cable that leads to a next communication pole is connected to the second interface of the adapter. In this way, a technician does not have to continue network deployment only after obtaining the right to use the current communication pole. This can reduce a network deployment time and shorten a network deployment period. After the right to use the current communication pole is obtained later, the optical cable connection box at the current communication pole can be directly replaced with a fiber access terminal. In this case, an operation is simple and time-saving.

In an embodiment, the adapter is a detachable adapter and includes a first body part and a second body part in an axial direction, and the first body part and the second body part are mounted to form the adapter.

The first body part and the second body part may be two parts separated along a central surface of the adapter in a length direction.

In this way, in a process of inserting an optical cable into the adapter, the first body part and the second body part may be separated; an optical fiber connector of an optical cable located on a left side of the adapter is placed in the first interface, and a ferrule of the optical cable is located inside a protective sheath; and an optical fiber connector of an optical cable located on a right side of the adapter is placed in the second interface, and a ferrule of the optical cable is located inside a protective sheath. In this way, a case in which a ferrule is broken in the process of inserting the optical cable into the adapter can be avoided, thereby protecting the ferrule of the inserted optical cable.

In an embodiment, a limiting sleeve is provided at a location that is inside the adapter and that is corresponding to the fixing flange, a sleeve wall of the limiting sleeve has elasticity, and fiber cores of two optical cables respectively inserted into the first interface and the second interface are located inside the limiting sleeve.

In an example, the ferrules of the optical cable led from the first interface of the adapter and the optical cable led from the second interface of the adapter are connected to each other in the limiting sleeve, and the interconnection in the limiting sleeve can improve optical cable interconnection precision.

In an embodiment, the adapter further includes a protective sheath, the protective sheath is located inside the limiting sleeve in an interference manner, and the ferrules of the two optical cables respectively inserted into the first interface and the second interface are located inside the protective sheath.

In an example, the protective sheath has flexibility, and can protect the ferrules of the optical cables located inside the protective sheath.

In an embodiment, there are a plurality of strip notches in the sleeve wall of the limiting sleeve along a length direction, so that the sleeve wall of the limiting sleeve has elasticity.

In an example, the sleeve wall of the limiting sleeve has elasticity, so that the protective sheath can be clamped in the limiting sleeve in an interference manner. For example, when the protective sheath is inserted into the limiting sleeve, the elastic sleeve wall of the limiting sleeve may be slightly expanded, and the protective sheath is clamped in the limiting sleeve. In this way, the protective sheath can be firmly located inside the limiting sleeve. The protective sheath has flexibility. Therefore, although an outer wall of the protective sheath is pressed tightly by the elastic sleeve wall of the limiting sleeve, a ferrule in the protective sheath is not damaged because an inner wall of the protective sheath has flexibility. In addition, stability of the ferrule in the protective sheath can be improved. Once stability of the ferrules of the two optical cables in the protective sheath is improved, alignment accuracy of the ferrules is also improved.

According to another aspect, an optical cable connection box is further provided. The optical cable connection box includes a box body and the adapter according to any one of the foregoing implementations. The adapter is fastened in the box body by using the fixing flange; a first optical cable port and a second optical cable port are provided on a box wall of the box body, a position of the first optical cable port is opposite to a position of the first interface, and a position of the second optical cable port is opposite to a position of the second interface; and an optical cable located on one side of the optical cable connection box can be inserted into the first interface after passing through the first optical cable port, and an optical cable located on the other side of the optical cable connection box can be inserted into the second interface after passing through the second optical cable port.

In this way, an optical cable located on a left side of the optical cable connection box may be inserted into the first interface of the adapter after passing through the first optical cable port on a left box wall, and an optical cable located on a right side of the optical cable connection box may be inserted into the second interface of the adapter after passing through the second optical cable port on a right box wall. The optical cables located on both sides of the optical cable connection box may be connected to each other by using the optical cable connection box.

In an embodiment, the fixing flange is provided with an arc-shaped groove along a circumferential direction, the box body is provided with an arc-shaped protrusion that matches the arc-shaped groove, and the fixing flange is fastened in the box body by using the arc-shaped protrusion that is located in the arc-shaped groove.

In this way, when the adapter is located inside the box body, the arc-shaped protrusion of the box body is clamped in the arc-shaped groove of the fixing flange, and then a box cover is covered on a box base, so that the adapter can be pressed into the box body.

In an embodiment, a flexible pad is provided in each of the first optical cable port and the second optical cable port.

In an example, a flexible pad may be provided in each of the first optical cable port and the second optical cable port, and the first optical cable port and the second optical cable port are configured to allow optical cables to pass through. In this case, the flexible pads in the first optical cable port and the second optical cable port can protect the optical cables passing through the first optical cable port and the second optical cable port. In addition, the flexible pad also has a sealing function, and the flexible pad is closely attached to an optical cable port. In this way, water, dust, and the like can be prevented from entering the box body from a gap between an optical cable and the optical cable port.

Beneficial effects brought by the technical solutions provided in the embodiments of this application include at least the following:

In the embodiments of this application, the optical cable connection box includes an adapter. In a scenario in which a network is being deployed but a right to use a current communication pole is not obtained, an optical cable that leads a previous communication pole to the current communication pole may be inserted into the adapter, and then an optical cable that leads to a next communication pole is also inserted into the adapter. In this way, a technician does not have to continue network deployment only after obtaining the right to use the current communication pole. This can reduce a network deployment time and shorten a network deployment period. After the right to use the current communication pole is obtained later, the optical cable connection box at the current communication pole can be directly replaced with a fiber access terminal. In this case, an operation is simple and time-saving.

DESCRIPTION OF REFERENCE SIGNS 1. box body; 11. first optical cable port; 12. second optical cable port; 13. arc-shaped protrusion; 14. box cover; and 15. box base;

2. adapter; 21. first interface; 22. second interface; 23. fixing flange; 26. limiting sleeve; 27. protective sheath; 28. dust-proof cap; 231. arc-shaped groove; and 261. strip notch;

2a. first body part; 2b. second body part; 2c. first adapter; and 2d. second adapter;

3. optical fiber; 31. first connector; and 32. second connector;

4. optical cable; and 10. first communication pole; 20. second communication pole; 30. third communication pole; 40. fourth communication pole; 100. optical cable connection box; and 200. fiber access terminal.

DESCRIPTION OF EMBODIMENTS

An embodiment of this application provides an optical cable connection box. The optical cable connection box may be configured to connect two optical cables. For example, the optical cable connection box may be configured to connect two outdoor optical cables. For another example, the optical cable connection box may also be configured to connect an outdoor optical cable and a drop optical cable. In an example, an optical fiber connector located at an end of an optical cable may be inserted into the optical cable connection box, and two optical cables are connected to each other by using the optical cable connection box.

An application scenario of the optical cable connection box may be as follows: A plurality of fiber access terminals (FATs) are arranged between a center office (CO) and a user; and when there is a relatively long distance between two adjacent fiber access terminals, a plurality of optical cables are used, and two adjacent optical cables may be connected to each other by using the optical cable connection box.

Another use scenario of the optical cable connection box may be as follows: During network deployment, a fiber access terminal is deployed in a residential area near a center office; and when a user applies for a network access service, a drop optical cable is connected to a nearby fiber access terminal to be led into the user's home. The fiber access terminal is usually mounted on a communication pole. Before a right to use the communication pole is obtained, the optical cable connection box may be used to temporarily replace the fiber access terminal, without delaying network deployment progress. After the right to use the communication pole is obtained later, the fiber access terminal is used to replace the optical cable connection box. In an embodiment, network deployment is not affected during a period in which the right to use the communication pole is obtained, and a network deployment period can be shortened.

Figure 1:
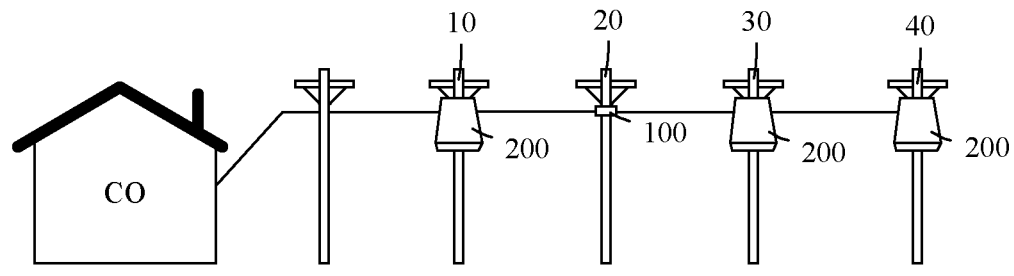
FIG. 1 is a diagram of a network deployment scenario according to an embodiment of this application.

For example, as shown in FIG. 1, network deployment needs to be performed in four residential areas near a center office (CO). The four residential areas are respectively denoted as a first residential area, a second residential area, a third residential area, and a fourth residential area. One fiber access terminal 200 needs to be mounted on each of a first communication pole 10 in the first residential area, a second communication pole 20 in the second residential area, a third communication pole 30 in the third residential area, and a fourth communication pole 40 in the fourth residential area. Rights to use the first communication pole 10, the third communication pole 30, and the fourth communication pole 40 have been obtained, but a right to use the second communication pole 20 has not been obtained temporarily.

Therefore, in network deployment, as shown in FIG. 1, a fiber access terminal 200 may be mounted on each of the first communication pole 10, the third communication pole 30, and the fourth communication pole 40, and a first optical cable and a second optical cable are temporarily connected to each other by using an optical cable connection box 100 at the second communication pole 20. The first optical cable is an optical cable led from the first communication pole 10, and the second optical cable is an optical cable led from the third communication pole 30. In this way, a technician may continue to perform network deployment without obtaining the right to use the second communication pole 20. After the right to use the second communication pole 20 is obtained later, the optical cable connection box 100 at the second communication pole 20 can be directly replaced with the fiber access terminal 200. In this case, an operation is simple and time-saving, thereby shortening a network deployment period.

The optical cable connection box has a relatively small size, and occupies relatively small space of a communication pole when being mounted on the communication pole, and a right to use the communication pole does not need to be obtained. By contrast, the fiber access terminal is internally provided with a relatively large quantity of components, a plurality of drop optical cables are led out from the fiber access terminal, and the like. Therefore, the fiber access terminal has a relatively large size, and a right to use a communication pole needs to be obtained for mounting the fiber access terminal on the communication pole.

An optical cable used by the optical cable connection box for connection may be a single-core optical cable, a dual-core optical cable, a multi-core optical cable, or the like. This is not limited in this embodiment.

The foregoing is an application scenario of the optical cable connection box. The following describes a structure of the optical cable connection box.

Figure 2:
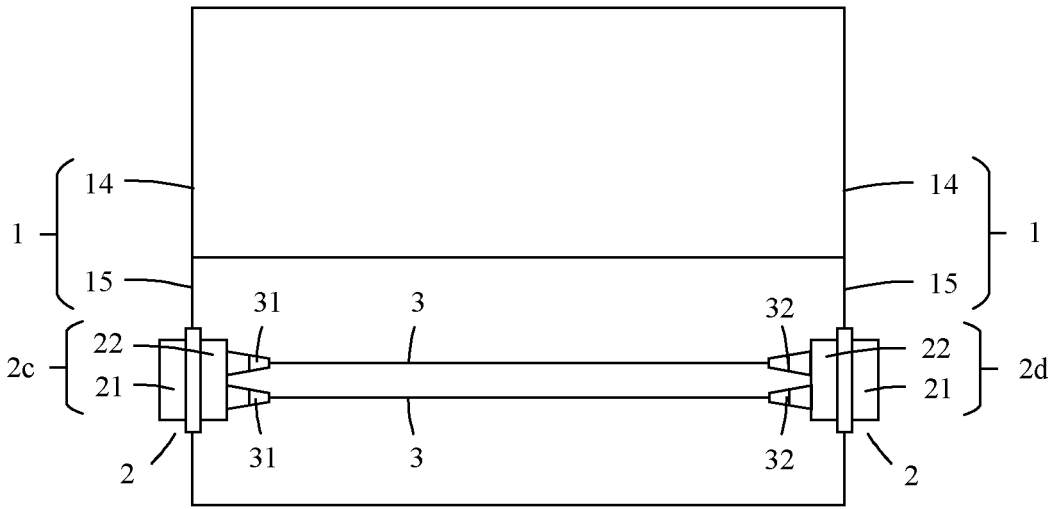
FIG. 2 is a diagram of an optical cable connection box according to an embodiment of this application.

As shown in FIG. 2, the optical cable connection box 100 includes a box body 1, at least one pair of adapters 2, and at least one optical fiber 3. Each adapter 2 includes a first interface 21 and a second interface 22 that are opposite to each other. The at least one pair of adapters 2 is located on the box body 1, the first interface 21 of each adapter 2 is located outside the box body 1, and the second interface 22 of each adapter 2 is located inside the box body 1. The at least one optical fiber 3 is located inside the box body 1 and is connected between the second interfaces 22 of each pair of adapters 2.

In an example, a contour shape of the box body 1 may be a cylindrical shape, or may be a cubic column shape, or the like. This is not limited in this embodiment. As shown in FIG. 2, the box body 1 may include a box cover 14 and a box base 15. The box cover 14 is covered on the box base 15 to form the box body 1. Shapes of the box cover 14 and the box base 15 may be flexibly selected by a technician based on an actual situation.

For example, the box cover 14 may be of a semi-columnar structure, and the box base 15 may also be of a semi-columnar structure. The semi-columnar structure is a half structure obtained by cutting along a length direction of a columnar structure. In this case, after the box cover 14 is covered on the box base 15, the box body 1 of a cylindrical structure can be obtained. For another example, the box cover 14 may be of a semi-columnar structure, the box base 15 may be of a plate-like structure that matches the box cover 14, and a box wall of the box cover 14 is fastened to the box base 15 of the plate-like structure to obtain the box body 1 of the semi-columnar structure. For another example, the box cover 14 is of a plate-like structure, the box base 15 is of a semi-columnar structure, and the box cover 14 of the plate-like structure is fastened to a box wall of the box base 15 to obtain the box body 1 of the semi-columnar structure.

For another example, the box cover 14 is a strip-shaped cubic column without a bottom, the box base 15 is a strip-shaped cubic column without a cover, and a box wall of the box cover 14 is fastened to a box wall of the box base 15 to obtain the box body 1 of the strip-shaped cubic column. For another example, the box cover 14 is a strip-shaped cubic column without a bottom, the box base 15 is of a plate-like structure, and a box wall of the box cover 14 is fastened to the box base 15 of the plate-like structure to obtain the box body 1 of the strip-shaped cubic column. For another example, the box cover 14 is a plate-like structure, the box base 15 is a strip-shaped cubic column without a cover, and the box cover 14 of the plate-like structure is fastened to a box wall of the box base 15 to obtain the box body 1 of the strip-shaped cubic column.

In this embodiment, the structures of the box cover 14 and the box base 15 of the box body 1 are not limited, provided that the box body 1 having closed space can be obtained after the box cover 14 is covered on the box base 15.

In an example, there are various manners for mounting the box cover 14 and the box base 15. For example, a mounting manner may be as follows: The box cover 14 is hinged to the box base 15, the box cover 14 is covered on the box base 15, and the box cover 14 may be unscrewed from the box base 15, to help a technician perform some operations. For another example, another mounting manner may be as follows: The box cover 14 and the box base 15 are mounted together by using screws; and when a technician needs to open the box body 1 to perform some operations, the technician needs to unscrew the screws. A manner for mounting the box cover 14 and the box base 15 is not limited in this embodiment.

In an example, to protect components inside the box body 1 and prevent rainwater, dust, and the like from entering the box body 1, correspondingly, a sealing washer is provided between the box cover 14 and the box base 15 to improve sealing between the box cover 14 and the box base 15. In this way, the components inside the box body 1 are protected.

As described above, each pair of adapters 2 is located on the box body 1, the first interface 21 of each adapter 2 is located outside the box body, and the second interface 22 of each adapter 2 is located inside the box body 1. For example, the adapter 2 may be located on a box wall of the box body 1. For another example, the adapter 2 may be located on the box cover 14 of the box body 1. For another example, the adapter 2 may be located on the box base 15 of the box body 1. In this embodiment, whether the adapter 2 is located on the box wall, the box cover 14, or the box base 15 is not limited. An example in which the adapter 2 is located on the box wall may be used.

In an example, a box wall of the box body 1 may be provided with two optical cable ports, one optical cable port is used to mount a first adapter 2c, and the other optical cable port is used to mount a second adapter 2d. The two optical cable ports may be respectively denoted as a first optical cable port and a second optical cable port. For example, the first adapter 2c may be mounted in the first optical cable port, a first interface 21 of the first adapter 2c extends out of the box body 1, and a second interface 22 of the first adapter 2c is located inside the box body 1. The second adapter 2d may be mounted in the second optical cable port, a first interface 21 of the second adapter 2d extends out of the box body 1, and a second interface 22 of the second adapter 2d is located inside the box body 1.

Flexible pads may be provided in the first optical cable port and the second optical cable port, and the flexible pads can protect the adapters 2 mounted in the first optical cable port and the second optical cable port. In addition, a flexible pad also has a sealing function, and the flexible pad is closely attached to an optical cable port. In this way, water, dust, and the like can be prevented from entering the box body from a gap between an adapter 2 and the optical cable port.

The adapter 2 is mounted in the optical cable port. A fixing flange of the adapter 2 is located in the optical cable port, and is fastened, by using a fixing nut, to a box wall in which the optical cable port is located. The first interface 21 of each adapter 2 extends out of the box body 1, and the second interface 22 of each adapter 2 is located inside the box body 1.

The foregoing describes a structure of the box body 1 of the optical cable connection box. The following describes the adapter 2 of the optical cable connection box. The adapter 2 may be a common adapter and includes two interfaces opposite to each other, one interface is used to connect a fiber patch cord, and the other interface is used to connect an optical cable. The fiber patch cord is an optical fiber with optical fiber connectors at both ends.

The optical cable connection box may include at least one pair of adapters 2. For example, the optical cable connection box includes one pair of adapters 2. For another example, the optical cable connection box includes two pairs of adapters 2. A quantity of pairs of adapters 2 is not limited in this embodiment, and one pair of adapters 2 may be used as an example. One pair of adapters 2 may include two adapters, and the adapters may be respectively denoted as a first adapter 2c and a second adapter 2d.

In an example, if an optical cable connected to the optical cable connection box is a single-core optical cable, the first adapter 2c and the second adapter 2d are both single-core adapters; if an optical cable connected to the optical cable connection box is a dual-core optical cable, the first adapter 2c and the second adapter 2d are both dual-core adapters; and if an optical cable connected to the optical cable connection box is a multi-core optical cable, the first adapter 2c and the second adapter 2d are both multi-core adapters. Whether the optical cable is a single-core optical cable or a multi-core optical cable is not limited in this embodiment. In the accompanying drawings, a dual-core optical cable may be used as an example. Correspondingly, the first adapter 2c and the second adapter 2d are both dual-core adapters.

Still refer to FIG. 2. The first adapter 2c and the second adapter 2d are connected to each other by using an optical fiber 3. If the adapters 2 are single-core adapters, there is one optical fiber 3; and if the adapters 2 are dual-core adapters, there are two optical fibers 3. In this way, a second interface 22 of the first adapter 2c and a second interface 22 of the second adapter 2d are connected to each other by using the optical fiber 3.

The optical fiber connected between the first adapter 2c and the second adapter 2d may alternatively be a fiber patch cord. The fiber patch cord is an optical fiber with optical fiber connectors at both ends.

In this way, an optical cable located on a left side of the optical cable connection box and an optical cable located on a right side of the optical cable connection box are indirectly connected to each other by using a first adapter 2c mounted on a left box wall of the box body 1, an optical fiber 3 located inside the box body 1, and a second adapter 2d mounted on a right box wall of the box body 1. For example, an optical fiber connector of the optical cable located on the left side of the optical cable connection box is inserted into a first interface 21 of the first adapter 2c on the left box wall, and an optical fiber connector of the optical cable located on the right side of the optical cable connection box is inserted into a first interface 21 of the second adapter 2d on the right box wall; and the first interface 21 of the first adapter 2c and the second interface 22 of the second adapter 2d are connected to each other by using the optical fiber 3, so that the optical cable located on the left side of the optical cable connection box and the optical cable located on the right side of the optical cable connection box are connected to each other by using the optical cable connection box.

Based on the foregoing description, the optical cable connection box includes the box body 1, the at least one pair of adapters 2, and the at least one optical fiber 3, and each pair of adapters 2 are connected to each other by using at least one optical fiber 3. In a scenario in which a network is being deployed but a right to use a current communication pole is not obtained, an optical cable that leads a previous communication pole to the current communication pole may be connected in a first interface 21 of an adapter 2 in one pair of adapters, and then an optical cable that leads to a next communication pole is connected in a first interface 21 of the other adapter 2 in the one pair of adapters. In this way, a technician does not have to continue network deployment only after obtaining the right to use the current communication pole. This can reduce a network deployment time and shorten a network deployment period. After the right to use the current communication pole is obtained later, an optical cable connection box at the current communication pole can be directly replaced with a fiber access terminal. In this case, an operation is simple and time-saving.

In addition, a fiber access terminal on the previous communication pole and a fiber access terminal on the next communication pole can be connected to each other by using the optical cable connection box. This prevents a failure in mounting a fiber access terminal on the current communication pole from affecting the connection between the fiber access terminal on the previous communication pole and the fiber access terminal on the next communication pole, so that network usage in a residential area in which the next communication pole is located is not delayed.

A quantity of optical fibers 3 is related to a quantity of optical cables 4 connected to the optical cable connection box and a quantity of optical fibers included in each optical cable 4.

Figure 9:
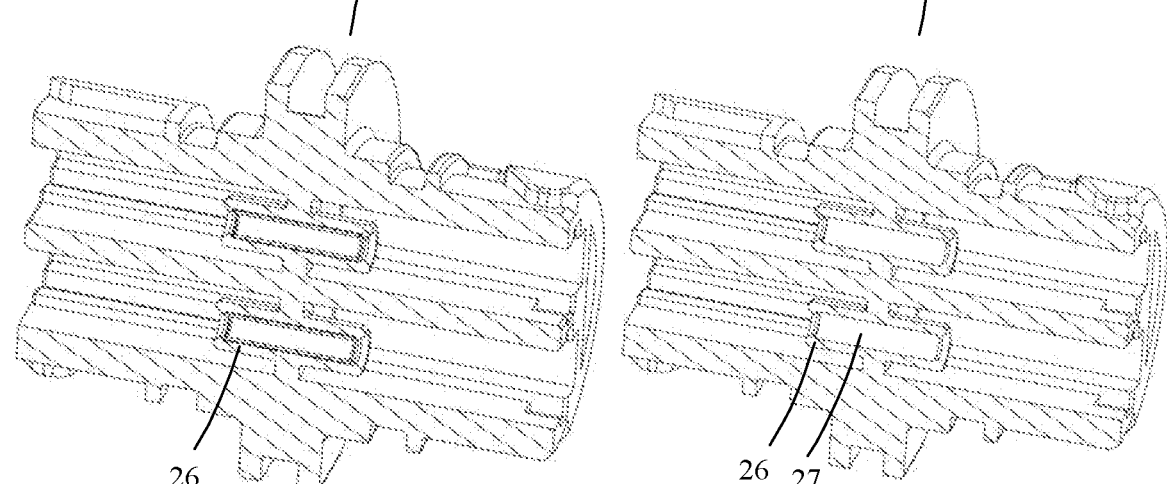
FIG. 9 is a diagram of an adapter according to an embodiment of this application.

For example, each side of the optical cable connection box is connected to n optical cables 4, and each optical cable 4 includes m optical fibers. In this case, a quantity of optical fibers 3 is m×n. For example, as shown in FIG. 9, each side of the optical cable connection box is connected to one optical cable 4, and each optical cable 4 includes two optical fibers. In this case, the quantity of optical fibers 3 is two.

In a scenario in which an optical cable inserted into the optical cable connection box is a multi-core optical cable, a line order of an optical cable connection may be adjusted by using a plurality of optical fibers 3 in the box body 1. An implementation structure may be as follows.

Figure 3:
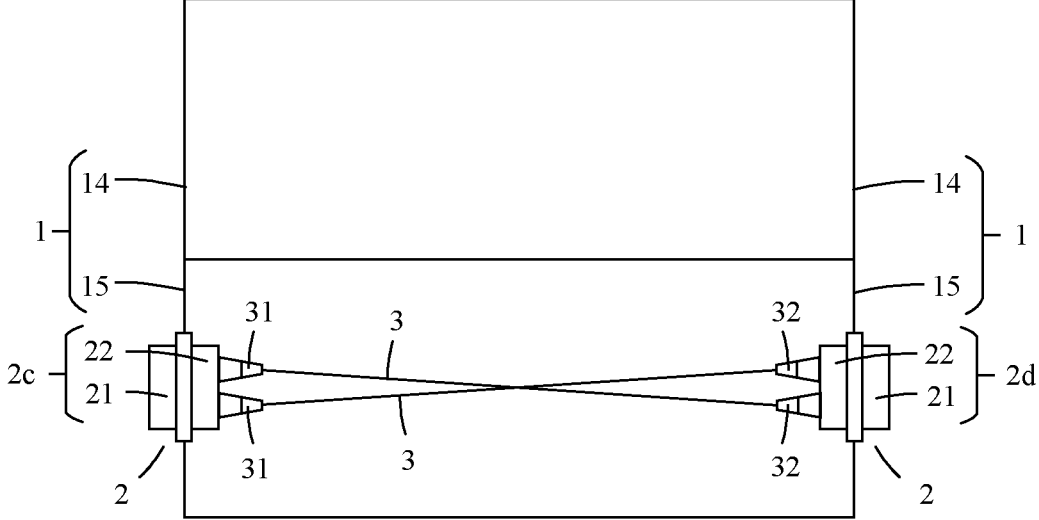
FIG. 3 is a diagram of an optical cable connection box according to an embodiment of this application.

As shown in FIG. 2 and FIG. 3, each adapter 2 is a multi-core adapter, the first interface 21 includes a plurality of sockets, the second interface 22 includes a plurality of sockets, and each pair of adapters 2 includes a first adapter 2c and a second adapter 2d. A first connector 31 of each optical fiber 3 is inserted into any socket of a second interface 22 of the first adapter 2c, and a second connector 32 of each optical fiber 3 is inserted into any socket of a second interface 22 of the second adapter 2d.

For example, the adapter 2 is a dual-socket adapter, a first interface 21 of the first adapter 2c includes two sockets, and the two sockets are configured to be connected to an optical fiber connector of a dual-core optical cable; and the second interface 22 of the first adapter 2c includes two sockets, and the two sockets are configured to be connected to an optical fiber 3 inside the box body 1. Similarly, a first interface 21 of the second adapter 2d includes two sockets, and the two sockets are configured to be connected to an optical fiber connector of a dual-core optical cable; and the second interface 22 of the second adapter 2d includes two sockets, and the two sockets are configured to be connected to an optical fiber 3 inside the box body 1.

There is one pair of adapters 2, and the adapter 2 is a dual-socket adapter. Correspondingly, there are two optical fibers 3, and the optical fibers 3 may be denoted as a first optical fiber and a second optical fiber. In this case, a first connector 31 of the first optical fiber may be inserted into any socket of the second interface 22 of the first adapter 2c, and a second connector 32 of the first optical fiber may be inserted into any socket of the second interface 22 of the second adapter 2d. A first connector 31 of the second optical fiber may be inserted into the remaining socket of the second interface 22 of the first adapter 2c, and a second connector 32 of the second optical fiber may be inserted into the remaining socket of the second interface 22 of the second adapter 2d.

For example, a first optical cable located on the left side of the optical cable connection box includes two optical fibers, and the optical fibers are respectively denoted as an optical fiber 1 and an optical fiber 2, and a second optical cable located on the right side of the optical cable connection box includes two optical fibers, and the optical fibers are respectively denoted as an optical fiber 1 and an optical fiber 2. If a technician intends to connect the optical fiber 1 of the first optical cable to the optical fiber 1 of the second optical cable and connect the optical fiber 2 of the first optical cable to the optical fiber 2 of the second optical cable, two optical fibers 3 located inside the box body 1 may be connected between the second interface 22 of the first adapter 2c and the second interface 22 of the second adapter 2d in a direct connection manner shown in FIG. 2. If a technician intends to connect the optical fiber 1 of the first optical cable to the optical fiber 2 of the second optical cable and connect the optical fiber 2 of the first optical cable to the optical fiber 1 of the second optical cable, the two optical fibers 3 located inside the box body 1 may be connected between the second interface 22 of the first adapter 2c and the second interface 22 of the second adapter 2d in a crossed manner shown in FIG. 3.

In an embodiment, two optical cables are indirectly connected to each other by using optical fibers 3, so that a line order of an optical fiber connection in an optical cable can be adjusted to improve use flexibility of the optical cable connection box.

Figure 4:
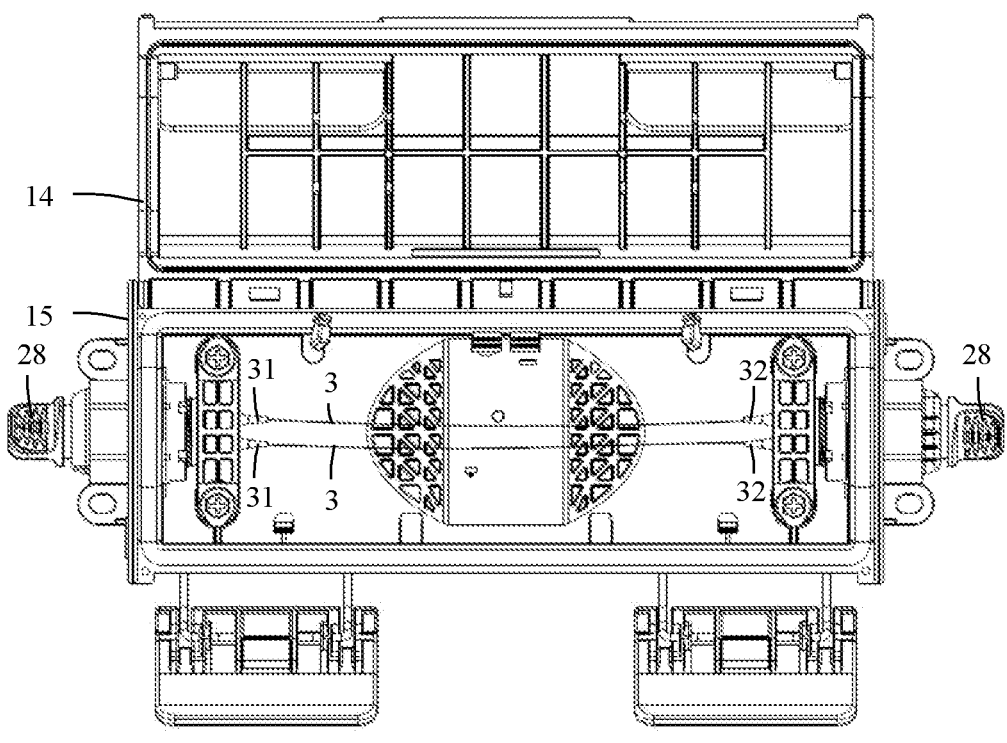
FIG. 4 is a diagram of an optical cable connection box according to an embodiment of this application.
Figure 5:
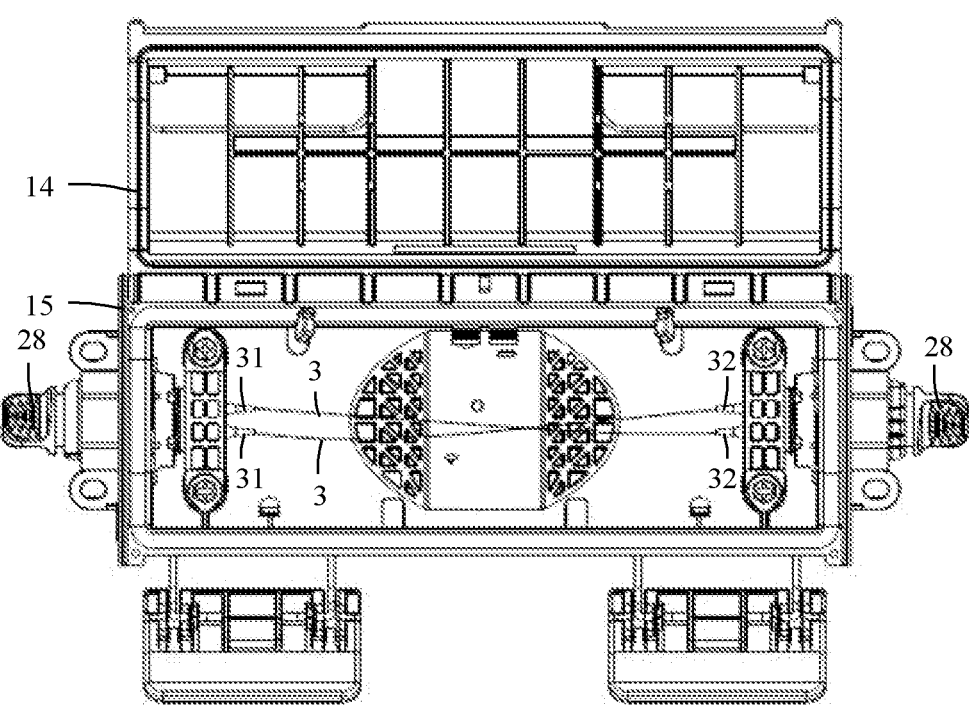
FIG. 5 is a diagram of an optical cable connection box according to an embodiment of this application.

In an example, when no optical cables are inserted into two sides of the optical cable connection box, to protect the first interface 21 located outside the box body 1, correspondingly, the adapter 2 further includes a dust-proof cap 28. As shown in FIG. 4 and FIG. 5, when no optical cable is inserted into a first interface 21 of a first adapter 2c located on the left side of the optical cable connection box, a dust-proof cap 28 may be inserted into the first interface 21, to prevent entry of water, dust, and the like into the first interface 21 from affecting alignment accuracy of optical cables. As shown in FIG. 4 and FIG. 5, when no optical cable is inserted into a first interface 21 of a second adapter 2d located on the right side of the optical cable connection box, a dust-proof cap 28 may be inserted into the first interface 21, to prevent entry of water, dust, and the like into the first interface 21 from affecting alignment accuracy of optical cables.

In an example, because optical cables can be directly inserted into the first interfaces 21 that are of the first adapter 2c and the second adapter 2d and that extend out of the box body 1, the box body 1 does not need to be opened. In this case, the box cover 14 and the box base 15 may be detachably or non-detachably fastened to each other. When using the optical cable connection box to connect two optical cables, a technician may directly insert the optical cables into the first interfaces 21 exposed outside the box body 1, without opening the box body 1. In this way, the operation is simple, and operation efficiency can be improved.

Figure 6:
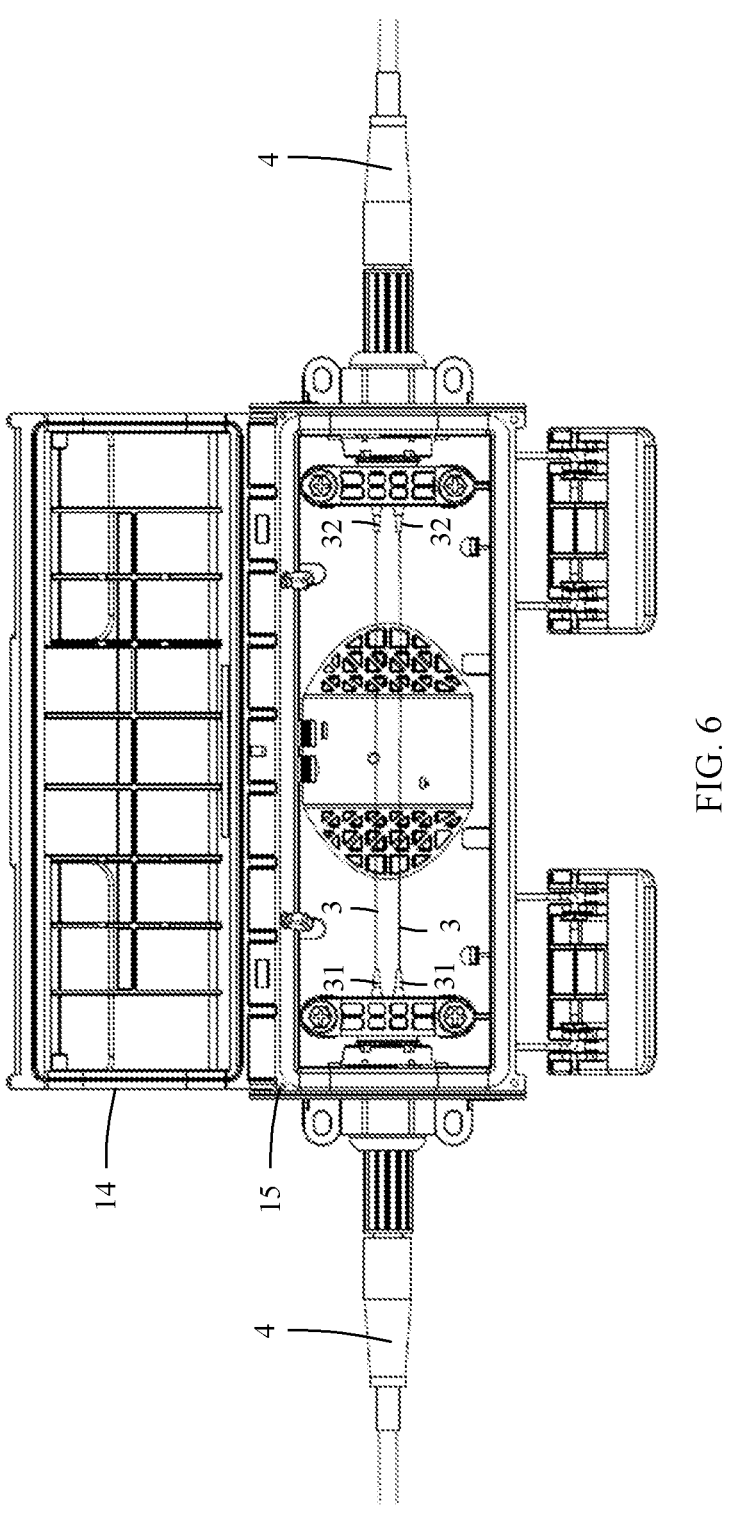
FIG. 6 is a diagram of an optical cable connection box connected to an optical cable according to an embodiment of this application.

In a use scenario, when no optical cables are inserted into two sides of the optical cable connection box, the first interfaces 21 that are of the first adapter 2c and the second adapter 2d and that extend out of the box body 1 each are provided with a dust-proof cap 28 to protect the first adapter 2c and the second adapter 2d. When the optical cable connection box needs to be used to connect optical cables, if an optical cable on the left side and an optical cable on the right side are directly connected, the box body 1 is opened, so that two optical fibers 3 in the box body 1 are inserted, in a direct connection manner shown in FIG. 4, into second interfaces 22 that are of the first adapter 2c and the second adapter 2d and that are located inside the box body 1. Then, the dust-proof caps 28 are removed, the optical cable on the left side is directly inserted into the first interface 21 of the first adapter 2c mounted on the left box wall of the box body 1, and the optical cable on the right side is inserted into the first interface 21 of the second adapter 2d mounted on the right box wall of the box body 1. For details, refer to the diagram of the structure shown in FIG. 6.

Figure 7:
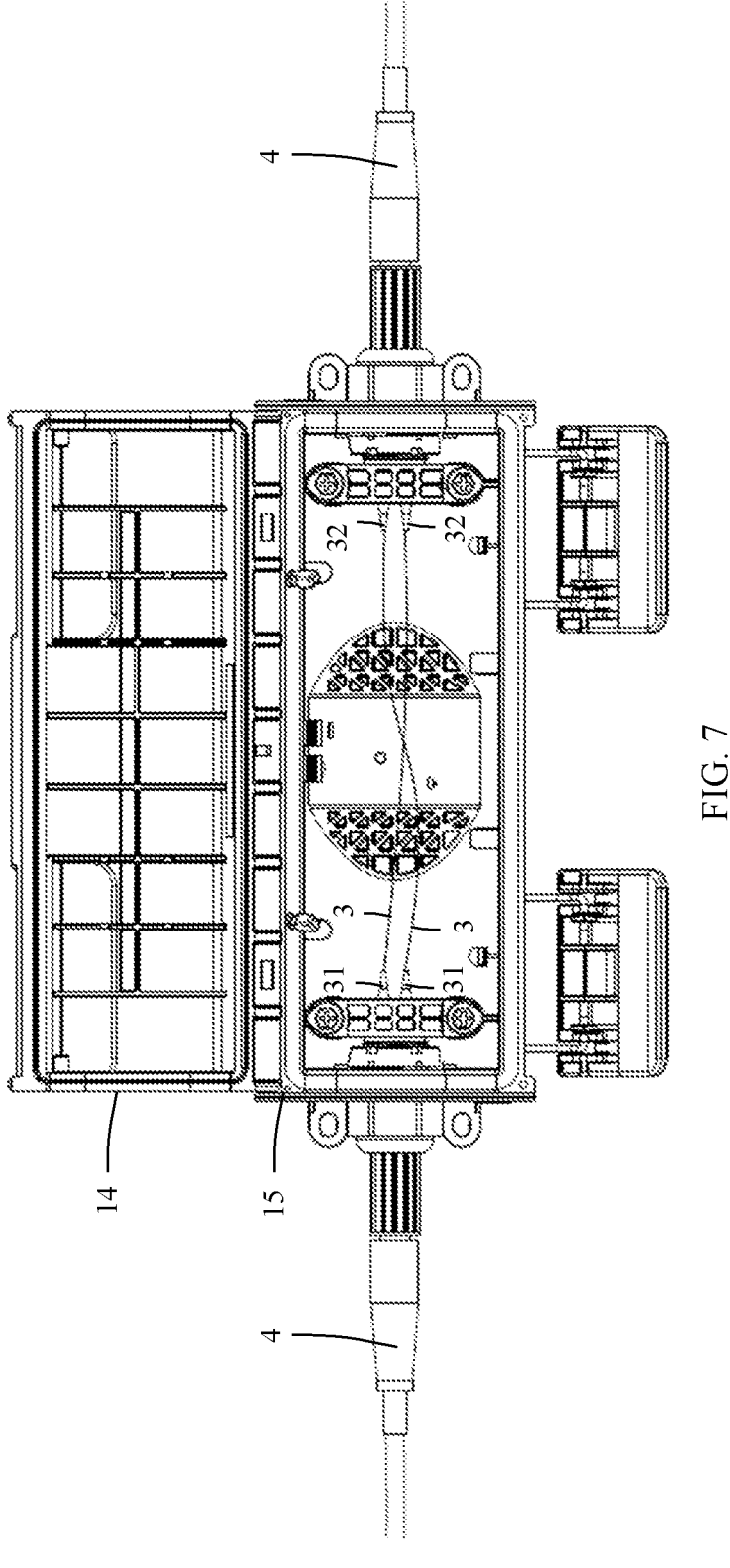
FIG. 7 is a diagram of an optical cable connection box connected to an optical cable according to an embodiment of this application.

If the optical cable on the left side and the optical cable on the right side are connected in a crossed manner, the box body 1 is opened, so that two optical fibers 3 in the box body 1 are inserted, in a crossed manner shown in FIG. 5, into second interfaces 22 that are of the first adapter 2c and the second adapter 2d and that are located inside the box body 1. Then, the dust-proof caps 28 are removed, the optical cable on the left side is directly inserted into the first interface 21 of the first adapter 2c mounted on the left box wall of the box body 1, and the optical cable on the right side is inserted into the first interface 21 of the second adapter 2d mounted on the right box wall of the box body 1. For details, refer to the diagram of the structure shown in FIG. 7.

In this embodiment of this application, the optical cable connection box includes the box body 1, the at least one pair of adapters 2, and the at least one optical fiber 3, and each pair of adapters 2 are connected to each other by using at least one optical fiber 3. In a scenario in which a network is being deployed but a right to use a current communication pole is not obtained, an optical cable 4 that leads a previous communication pole to the current communication pole may be connected in a first interface 21 of an adapter 2 in one pair of adapters, and then an optical cable 4 that leads to a next communication pole is connected in a first interface 21 of the other adapter 2 in the one pair of adapters. In this way, a technician does not have to continue network deployment only after obtaining the right to use the current communication pole. This can reduce a network deployment time and shorten a network deployment period. After the right to use the current communication pole is obtained later, an optical cable connection box at the current communication pole can be directly replaced with a fiber access terminal. In this case, an operation is simple and time-saving.

In addition, a fiber access terminal on the previous communication pole and a fiber access terminal on the next communication pole can be connected to each other by using the optical cable connection box. This prevents a failure in mounting a fiber access terminal on the current communication pole from affecting the connection between the fiber access terminal on the previous communication pole and the fiber access terminal on the next communication pole, so that network usage in a residential area in which the next communication pole is located is not delayed.

This application further provides an adapter. The adapter may replace the foregoing optical cable connection box, and is configured to implement interconnection of two optical cables.

Figure 8:
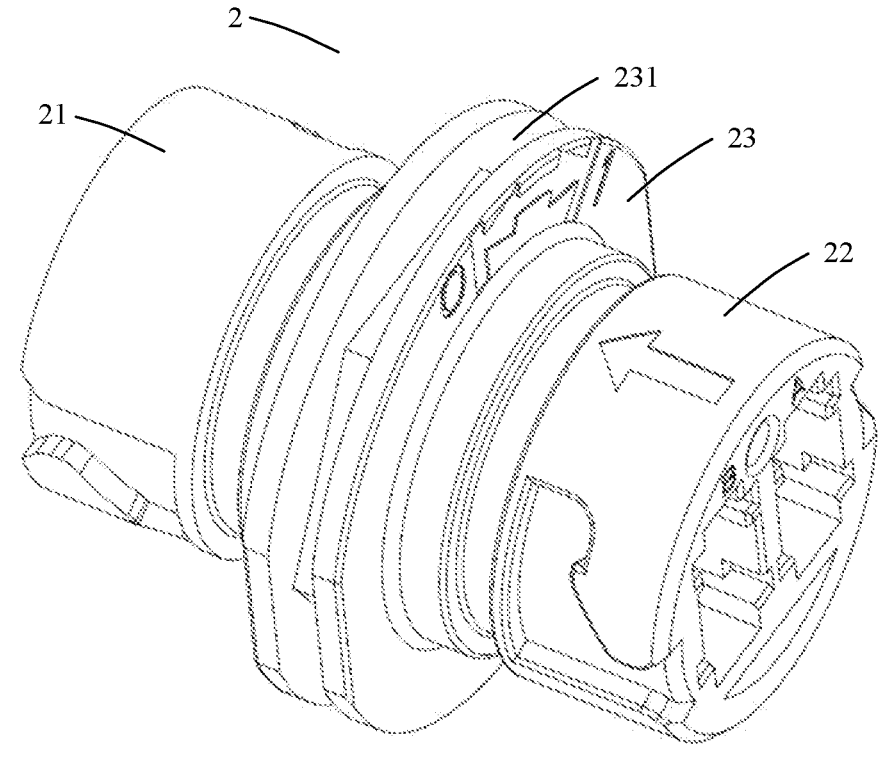
FIG. 8 is a diagram of an adapter according to an embodiment of this application.

As shown in FIG. 8, the adapter 2 may include a first interface 21, a second interface 22, and a fixing flange 23. The first interface 21 and the second interface 22 are of a same structure and are located on both sides of the fixing flange 23.

In an example, as shown in FIG. 8, the adapter 2 may include the first interface 21, the second interface 22, and the fixing flange 23. The first interface 21 and the second interface 22 are located on both sides of the fixing flange 23. For example, the first interface 21 is located on a left side of the fixing flange 23, and the second interface 22 is located on a right side of the fixing flange 23. Because the first interface 21 and the second interface 22 each are used to connect an optical cable, the first interface 21 and the second interface 22 are of a same structure. For example, the first interface 21 and the second interface 22 are symmetrical with respect to the fixing flange 23. Certainly, the first interface 21 and the second interface 22 may alternatively not be symmetrical with respect to the fixing flange 23.

As described above, an optical cable connected to the adapter 2 may be a single-core optical cable, a dual-core optical cable, or a multi-core optical cable, and the adapter 2 matches the optical cable connected to the adapter 2. For example, if the optical cable is a single-core optical cable, each interface of the adapter 2 is provided with a ferrule channel. For example, the first interface 21 and the second interface 22 each are provided with one socket. For another example, if the optical cable is a dual-core optical cable, each interface of the adapter 2 is provided with two sockets. For example, as shown in FIG. 8, the first interface 21 and the second interface 22 each are provided with two sockets.

Because the first interface 21 and the second interface 22 of the adapter 2 are of a same structure, the first interface 21 and the second interface 22 each may be used for inserting an optical cable. For example, an optical fiber connector of an optical cable located on a left side of the adapter 2 may be inserted into the first interface 21, and an optical fiber connector of an optical cable located on a right side of the adapter 2 may be inserted into the second interface 22, to implement interconnection between the two optical cables.

In this way, in a scenario in which a network is being deployed but a right to use a current communication pole is not obtained, an optical cable that leads a previous communication pole to the current communication pole may be connected to the first interface 21 of the adapter 2, and then an optical cable that leads to a next communication pole is connected to the second interface 22 of the adapter 2. In this way, a technician does not have to continue network deployment only after obtaining the right to use the current communication pole. This can reduce a network deployment time and shorten a network deployment period. After the right to use the current communication pole is obtained later, an optical cable connection box at the current communication pole can be directly replaced with a fiber access terminal. In this case, an operation is simple and time-saving.

In addition, a fiber access terminal on the previous communication pole and a fiber access terminal on the next communication pole can be connected to each other by using the adapter 2. This prevents a failure in mounting a fiber access terminal on the current communication pole from affecting the connection between the fiber access terminal on the previous communication pole and the fiber access terminal on the next communication pole, so that network usage in a residential area in which the next communication pole is located is not delayed.

In an example, ferrules of the optical cable led from the first interface 21 of the adapter 2 and the optical cable led from the second interface 22 of the adapter 2 are connected to each other in the middle of the adapter 2 at a position corresponding to the fixing flange 23. To enable the ferrules of the two optical cables to be precisely connected to each other, correspondingly, as shown in FIG. 9, there is a limiting sleeve 26 inside the adapter 2 at the position corresponding to the fixing flange 23, and the ferrules of the optical cable led from the first interface 21 and the optical cable led from the second interface 22 are connected to each other in the limiting sleeve 26. The interconnection in the limiting sleeve 26 can improve optical cable interconnection precision.

To protect the ferrules of the optical cables, correspondingly, as shown in FIG. 9, the limiting sleeve 26 may be provided with a protective sheath 27. A material of the protective sheath 27 has flexibility, to protect the ferrules therein.

To facilitate the insertion of the optical cables into the adapter 2, correspondingly, as shown in FIG. 9, the adapter 2 is a split-type adapter, and includes a first body part 2a and a second body part 2b in an axial direction. The first body part 2a and the second body part 2b are fastened to each other to form the adapter 2.

The first body part 2a and the second body part 2b may be two parts separated along a central surface of the adapter 2 in a length direction.

In this way, in a process of inserting an optical cable into the adapter 2, the first body part 2a and the second body part 2b may be separated; an optical fiber connector of an optical cable located on a left side of the adapter is placed in the first interface 21, and a ferrule of the optical cable is located inside a protective sheath 27; and an optical fiber connector of an optical cable located on a right side of the adapter is placed in the second interface 22, and a ferrule of the optical cable is located inside the protective sheath 27. In this way, a case in which a ferrule is broken in the process of inserting the optical cable into the adapter 2 can be avoided, thereby protecting the ferrule of the inserted optical cable.

Figure 10:
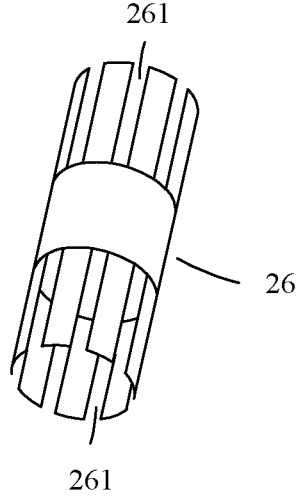
FIG. 10 is a diagram of a limiting sleeve of an adapter according to an embodiment of this application.

To further improve interconnection precision of the two optical cables, as shown in FIG. 10, a plurality of strip notches 261 are provided in a sleeve wall of the limiting sleeve 26 along a length direction, so that the sleeve wall of the limiting sleeve 26 has elasticity.

Because the adapter 2 is a split-type adapter and can be divided into the first body part 2a and the second body part 2*b* along the length direction, so that one part of the limiting sleeve 26 is located on the first body part 2*a* and the other part thereof is located on the second body part 2*b*. When the first body part 2*a* and the second body part 2*b* are fastened together, the limiting sleeve 26 may be formed.

In an example, the sleeve wall of the limiting sleeve 26 has elasticity, so that the protective sheath 27 can be clamped in the limiting sleeve 26 in an interference manner. For example, when the protective sheath 27 is inserted into the limiting sleeve 26, the elastic sleeve wall of the limiting sleeve 26 may be slightly expanded, and the protective sheath 27 is clamped in the limiting sleeve 26. In this way, the protective sheath 27 can be firmly located inside the limiting sleeve 26. The protective sheath 27 has flexibility. Therefore, although an outer wall of the protective sheath 27 is pressed tightly by the elastic sleeve wall of the limiting sleeve 26, a ferrule in the protective sheath 27 is not damaged because an inner wall of the protective sheath 27 has flexibility. In addition, stability of the ferrule in the protective sheath 27 can be improved. Once stability of the ferrules of the two optical cables in the protective sheath 27 is improved, alignment accuracy of the ferrules is also improved.

Because one part of the limiting sleeve 26 is located on the first body part 2*a* and the other part thereof is located on the second body part 2*b*, during mounting of the protective sheath 27 in the limiting sleeve 26, the protective sheath 27 may be first pressed into a part that is of the limiting sleeve 26 and that is located on the first body part 2*a*, or the protective sheath 27 may be first pressed into a part that is of the limiting sleeve 26 and that is located on the second body part 2*b*. As shown in FIG. 9, the protective sheath 27 is located in the part that is of the limiting sleeve 26 and that is located on the second body part 2*b*.

In an application scenario, when a technician intends to connect two optical cables by using the adapter 2, the adapter 2 is first split into two parts shown in FIG. 9, and the protective sheath 27 is clamped into the limiting sleeve 26 on the first body part 2*a*, or is clamped into the limiting sleeve 26 on the second body part 2*b*. Then, a ferrule of one optical cable is inserted into one end of the protective sheath 27 from the first interface 21, and a ferrule of the other optical cable is inserted into the other end of the protective sheath 27 from the second interface 22. In this way, the ferrules of the two optical cables are precisely connected to each other in the protective sheath 27. Subsequently, the first body part 2*a* and the second body part 2*b* are fastened together to obtain the adapter 2.

Afterwards, the adapter 2 may be lapped onto a communication pole, and after a right to use the communication pole is obtained later, a fiber access terminal is used for replacement. Because a size of the adapter 2 is far smaller than a size of the fiber access terminal, to ensure that the two optical cables connected to the adapter 2 can be connected to the fiber access terminal later, correspondingly, sufficient lengths are reserved for the optical cables on both sides of the adapter 2, so that the optical cables can be inserted into the fiber access terminal later, and excess optical cables can be wound around the adapter 2.

To ensure that the adapter 2 can be directly replaced with the fiber access terminal later, correspondingly, the first interface 21 and the second interface 22 that are of the adapter 2 and that are used to connect the optical cables respectively have same models and sizes as interfaces of an adapter that is in the fiber access terminal and that is used to connect optical cables.

In this embodiment of this application, in a scenario in which a network is being deployed but a right to use a current communication pole is not obtained, an optical cable that leads a previous communication pole to the current communication pole may be connected to the first interface 21 of the adapter 2, and then an optical cable that leads to a next communication pole is connected to the second interface 22 of the adapter 2. In this way, a technician does not have to continue network deployment only after obtaining the right to use the current communication pole. This can reduce a network deployment time and shorten a network deployment period. After the right to use the current communication pole is obtained later, an optical cable connection box at the current communication pole can be directly replaced with a fiber access terminal. In this case, an operation is simple and time-saving.

In addition, a fiber access terminal on the previous communication pole and a fiber access terminal on the next communication pole can be connected to each other by using the adapter 2. This prevents a failure in mounting a fiber access terminal on the current communication pole from affecting the connection between the fiber access terminal on the previous communication pole and the fiber access terminal on the next communication pole, so that network usage in a residential area in which the next communication pole is located is not delayed.

This application further provides an optical cable connection box. The optical cable connection box may include the adapter 2 shown in FIG. 8 to FIG. 10.

Figure 11:
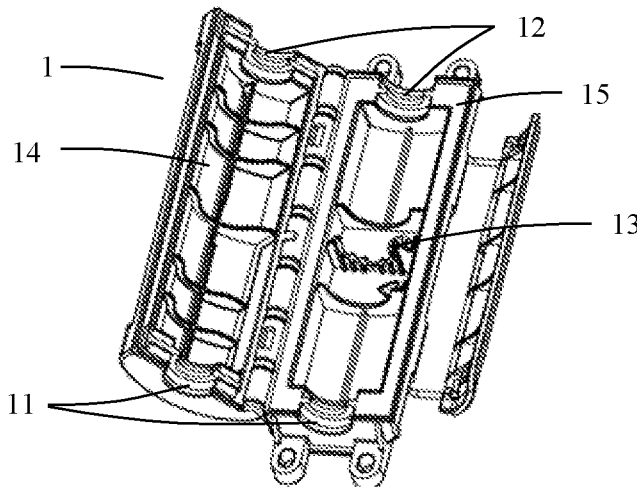
FIG. 11 is a diagram of a box body of an optical cable connection box according to an embodiment of this application.

As shown in FIG. 11 and FIG. 8, the optical cable connection box includes a box body 1 and the adapter 2 shown in FIG. 8 to FIG. 10. The adapter 2 is fastened in the box body 1 by using the fixing flange 23; a first optical cable port 11 and a second optical cable port 12 are provided in a box wall of the box body 1, a position of the first optical cable port 11 is opposite to a position of the first interface 21, and a position of the second optical cable port 12 is opposite to a position of the second interface 22; and an optical cable 4 located on one side of the optical cable connection box can be inserted into the first interface 21 after passing through the first optical cable port 11, and an optical cable 4 located on the other side of the optical cable connection box can be inserted into the second interface 22 after passing through the second optical cable port 12.

The adapter 2 is mounted in the box body 1. As shown in FIG. 11, the box body 1 is of an openable structure. A box cover 14 and a box base 15 are detachably fastened to each other, so that during connection to two optical cables, the box cover 14 can be opened from the box base 15, and the two optical cables can be respectively inserted into the first interface 21 and the second interface 22 of the adapter 2 located inside the box body 1.

The adapter 2 is located inside the box body 1, and the box body 1 can protect the adapter 2 to prolong a service life of the adapter 2. The adapter 2 is located inside the box body 1, and can further have dust-proof and waterproof functions.

In an example, because the adapter 2 configured to insert two optical cables is located inside the box body 1, to enable an optical cable outside the box body 1 to be inserted into the adapter 2 located inside the box body 1, correspondingly, two optical cable ports are disposed in the box body 1. A position of one optical cable port is opposite to a position of the first interface 21, and a position of the other optical cable port is opposite to a position of the second interface 22. For example, the two optical cable ports may be respectively denoted as a first optical cable port 11 and a second optical cable port 12. A position of the first optical cable port 11 is opposite to the position of the first interface 21, and a position of the second optical cable port 12 is opposite to the position of the second interface 22.

There may be the following several cases for the positions of the first optical cable port 11 and the second optical cable port 12 on the box body 1.

Figure 12:
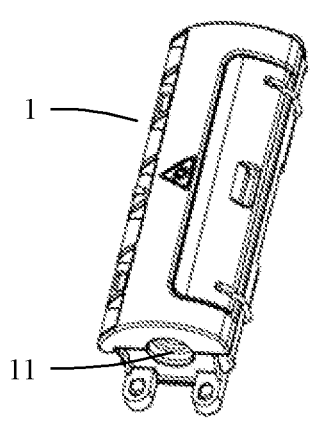
FIG. 12 is a diagram of a box body of an optical cable connection box according to an embodiment of this application.

Both the first optical cable port 11 and the second optical cable port 12 may be located on the box cover 14. Both the first optical cable port 11 and the second optical cable port 12 may alternatively be located on the box base 15. As shown in FIG. 11 and FIG. 12, alternatively, a part of the first optical cable port 11 may be located on the box cover 14, and the other part thereof may be located on the box base 15. When the box cover 14 is covered on the box base 15, the first optical cable port 11 is formed. Similarly, for the second optical cable port 12, one part of the second optical cable port 12 may be located on the box cover 14, and the other part thereof may be located on the box base 15. When the box cover 14 is covered on the box base 15, the second optical cable port 12 is formed. In this embodiment, positions of the first optical cable port 11 and the second optical cable port 12 are not limited.

The adapter 2 is mounted in the box body 1, and the first optical cable port 11 and the second optical cable port 12 are configured to allow optical cables to pass through. For example, the first optical cable port 11 is configured to allow an optical cable located on a left side of the optical cable connection box to pass through, and the second optical cable port 12 is configured to allow an optical cable located on a right side of the optical cable connection box to pass through.

In an example, a flexible pad may be provided in each of the first optical cable port 11 and the second optical cable port 12, and the first optical cable port 11 and the second optical cable port 12 are configured to allow optical cables to pass through. In this case, the flexible pads in the first optical cable port 11 and the second optical cable port 12 can protect the optical cables passing through the first optical cable port 11 and the second optical cable port 12. In addition, the flexible pad also has a sealing function, and the flexible pad is closely attached to an optical cable port. In this way, water, dust, and the like can be prevented from entering the box body from a gap between an optical cable and the optical cable port.

In an example, there may be one or more first optical cable ports 11, and there may be one or more second optical cable ports 12. For example, there is one optical cable on the left side of the optical cable connection box, and there is one optical cable on the right side of the optical cable connection box. In this case, the optical cable connection box is configured to connect the two optical cables, there are one first optical cable port 11 and one second optical cable port 12. For another example, there are two optical cables on the left side of the optical cable connection box, and there are two optical cables on the right side of the optical cable connection box. In this case, there are two first optical cable ports 11 and two second optical cable ports 12. Alternatively, when there are two optical cables on each of the left side and the right side of the optical cable connection box, there may be one first optical cable port 11 and one second optical cable port 12; and sizes of the first optical cable port 11 and the second optical cable port 12 are relatively large, so that two optical cables can pass through each of the first optical cable port 11 and the second optical cable port 12.

Quantities of the first optical cable ports 11 and the second optical cable ports 12 are not limited in this embodiment, and one first optical cable port 11 and one second optical cable port 12 may be used as an example.

In this way, the optical cable located on the left side of the optical cable connection box may be inserted into the first interface 21 of the adapter 2 after passing through the first optical cable port 11 on a left box wall, and the optical cable located on the right side of the optical cable connection box may be inserted into the second interface 22 of the adapter 2 after passing through the second optical cable port 12 on a right box wall. The optical cables located on both sides of the optical cable connection box may be connected to each other by using the optical cable connection box.

As described above, the adapter 2 may be fastened in the box body 1 by using the fixing flange 23. The fixing flange 23 is configured to connect the first interface 21 and the second interface 22, and is further configured to fasten the adapter 2 in the box body 1.

In an example, the fixing flange 23 of the adapter 2 may be fastened in the box body 1 through matching of a protrusion and a groove. For example, as shown in FIG. 8, the fixing flange 23 of the adapter 2 is provided with an arc-shaped groove 231 along a circumferential direction of the fixing flange 23. As shown in FIG. 11, the box body 1 is provided with an arc-shaped protrusion 13 that matches the arc-shaped groove 231, and the adapter 2 is fastened in the box body 1 by using the arc-shaped protrusion 13 that is located in the arc-shaped groove 231. In this way, when the adapter 2 is located inside the box body 1, the arc-shaped protrusion 13 of the box body 1 is clamped in the arc-shaped groove 231 of the fixing flange 23, and then the box cover 14 is covered on the box base 15, so that the adapter 2 can be pressed into the box body 1.

For another example, the fixing flange 23 of the adapter 2 is provided with an arc-shaped protrusion, and the box body 1 is provided with an arc-shaped groove that matches the arc-shaped protrusion. When the adapter 2 is located inside the box body 1, the arc-shaped protrusion of the fixing flange 23 is clamped in the arc-shaped groove of the box body 1, and then the box cover 14 is covered on the box base 15, so that the adapter 2 can be pressed into the box body 1.

This embodiment sets no limitation on whether the fixing flange 23 is provided with a groove and the box body 1 is provided with a protrusion, or the fixing flange 23 is provided with a protrusion and the box body 1 is provided with a groove, provided that the fixing flange 23 and the box body 1 can be fastened to each other.

In an example, the fixing flange 23 of the adapter 2 may alternatively be fastened in the box body 1 in another manner. For example, the fixing flange 23 of the adapter 2 may be mounted in the box body 1 by using a screw. For another example, the fixing flange 23 of the adapter 2 may alternatively be fastened in the box body 1 by welding. In this embodiment, a manner of securing the adapter 2 to the box body 1 is not limited, provided that the adapter 2 can be stably fastened in the box body 1. For ease of understanding, in the accompanying drawings, an example in which the fixing flange 23 and the box body 1 are fastened to each other through matching of a protrusion and a groove may be used, and an example in which the fixing flange 23 is provided with a groove and the box body 1 is provided with a protrusion is used. The following uses an example in which the fixing flange 23 is provided with an arc-shaped groove and the box body 1 is provided with an arc-shaped protrusion to describe in detail structures of the arc-shaped groove and the arc-shaped protrusion.

The arc-shaped groove 231 is a circular groove disposed along the circumferential direction of the fixing flange 23.

For example, as shown in FIG. 8, the arc-shaped groove 231 is a complete circumferential groove penetrating an entire circumference of the fixing flange 23. For example, a radian of the arc-shaped groove 231 is 360 degrees. For another example, the arc-shaped groove 231 may alternatively be an incomplete circumferential groove. For example, a radian of the arc-shaped groove 231 is 60 degrees, 120 degrees, or the like. In this embodiment, the radian of the arc-shaped groove 231 is not limited, and a technician may flexibly set the radian based on an actual situation.

In an example, the arc-shaped protrusion 13 located inside the box body 1 matches the arc-shaped groove 231. For example, a thickness of the arc-shaped protrusion 13 is slightly smaller than a groove width of the arc-shaped groove 231, so that the arc-shaped protrusion 13 can be clamped in the arc-shaped groove 231.

In an example, the arc-shaped protrusion 13 may be located on the box base 15 of the box body 1, or on the box cover 14 of the box body 1. Alternatively, the box cover 14 and the box base 15 each may be provided with an arc-shaped protrusion 13, positions of the arc-shaped protrusion 13 on the box cover 14 and the arc-shaped protrusion 13 on the box base 15 may be opposite to each other, and an arc-shaped groove 231 whose radian is 360 degrees may be provided in the circumferential direction of the fixing flange 23. In this way, the fixing flange 23 is located inside the box base 15, the arc-shaped protrusion 13 on the box base 15 is clamped in the arc-shaped groove 231; and when the box cover 14 is covered on the box base 15, the arc-shaped protrusion 13 on the box cover 14 is also clamped in the arc-shaped groove 231, so that the adapter 2 can be fastened in the box body 1.

This embodiment sets no limitation on whether the arc-shaped protrusion 13 in the box body 1 is located on the box cover 14 or the box base 15, or the box cover 14 and the box base 15 each are provided with an arc-shaped protrusion 13, provided that the adapter 2 can be fastened in the box body 1.

In a relative position relationship, the adapter 2 may be located at a middle position of the box body 1, or the adapter 2 may be located at a position that is in the box body 1 and that is close to an end part of the box body 1. A position of the adapter 2 in the box body 1 is not limited in this embodiment.

Figure 14:
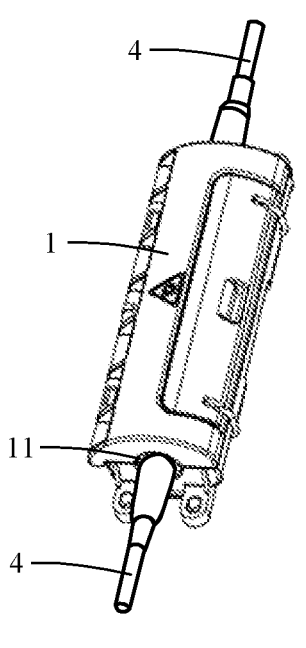
FIG. 14 is a diagram of an optical cable connection box connected to an optical cable according to an embodiment of this application.

As shown in FIG. 11, the box cover 14 is opened from the box base 15, the box body 1 is in an open state, the optical cable 4 located on the left side of the optical cable connection box is inserted into the first interface 21 of the adapter 2 after passing through the first optical cable port 11 on the box wall of the box body 1, and the optical cable 4 located on the right side of the optical cable connection box is inserted into the second interface 22 of the adapter 2 after passing through the second optical cable port 12 on the box wall of the box body 1. Then, the box cover 14 is covered on the box base 15. As shown in FIG. 14, the box body 1 is in a closed state, the optical cable 4 located on the left side of the optical cable connection box extends out of the box body 1 from the first optical cable port 11, and the optical cable 4 located on the right side of the optical cable connection box extends out of the box body 1 from the second optical cable port 12.

Figure 13:
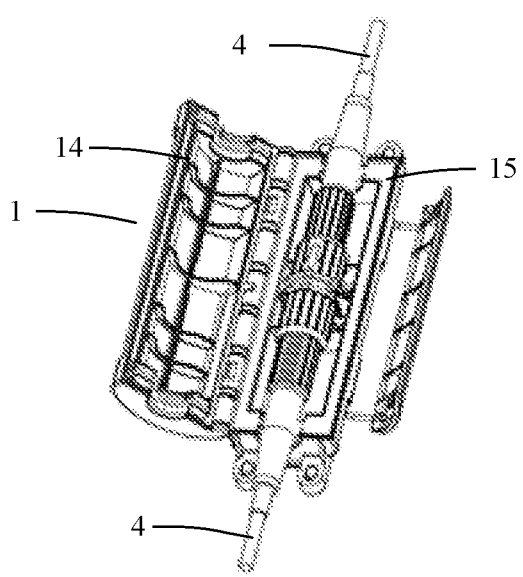
FIG. 13 is a diagram of an optical cable connection box connected to an optical cable according to an embodiment of this application.

In an application scenario, when a technician intends to connect two optical cables by using the optical cable connection box, the box cover 14 is first opened from the box base 15. As shown in FIG. 11, the box body 1 is in the open state. Then, the adapter 2 may be split into two parts shown in FIG. 9, and the protective sheath 27 may be clamped in the limiting sleeve 26 on the first body part 2a or the limiting sleeve 26 on the second body part 2b. Later, a ferrule of one optical cable is inserted into one end of the protective sheath 27 through a ferrule channel of the first interface 21, and a ferrule of the other optical cable is inserted into the other end of the protective sheath 27 through a ferrule channel of the second interface 22. In this way, the ferrules of the two optical cables are precisely connected to each other in the protective sheath 27. Subsequently, the first body part 2a and the second body part 2b are fastened together to obtain the adapter 2. Next, the adapter 2 with optical cables inserted into the first interface 21 and the second interface 22 is fastened in the box base 15 by using the fixing flange 23. For details, refer to the diagram shown in FIG. 13. Subsequently, the box cover 14 is covered on the box base 15, and the two optical cables respectively extend out of the box body 1 through the first optical cable port 11 and the second optical cable port 12. For details, refer to the diagram shown in FIG. 14.

Afterwards, the optical cable connection box may be lapped onto a communication pole, and after a right to use the communication pole is obtained later, a fiber access terminal is used for replacement. Because a size of the optical cable connection box is far smaller than a size of the fiber access terminal, to ensure that the two optical cables connected to the optical cable connection box can be connected to the fiber access terminal later, correspondingly, sufficient lengths are reserved for the optical cables on both sides of the optical cable connection box, so that the optical cables can be inserted into the fiber access terminal later, and excess optical cables can be wound around the optical cable connection box.

To ensure that the optical cable connection box can be directly replaced with the fiber access terminal later, correspondingly, the first interface 21 and the second interface 22 that are of the adapter 2 and that are used to connect the optical cables respectively have same models and sizes as interfaces of an adapter that is in the fiber access terminal and that is used to connect optical cables.

In the embodiments of this application, the optical cable connection box includes the box body and the adapter. In a scenario in which a network is being deployed but a right to use a current communication pole is not obtained, an optical cable that leads a previous communication pole to the current communication pole may be inserted into the adapter, and then an optical cable that leads to a next communication pole is also inserted into the adapter. In this way, a technician does not have to continue network deployment only after obtaining the right to use the current communication pole. This can reduce a network deployment time and shorten a network deployment period. After the right to use the current communication pole is obtained later, an optical cable connection box at the current communication pole can be directly replaced with a fiber access terminal. In this case, an operation is simple and time-saving.

In addition, a fiber access terminal on the previous communication pole and a fiber access terminal on the next communication pole can be connected to each other by using the optical cable connection box. This prevents a failure in mounting a fiber access terminal on the current communication pole from affecting the connection between the fiber access terminal on the previous communication pole and the fiber access terminal on the next communication pole, so that network usage in a residential area in which the next communication pole is located is not delayed.

The foregoing descriptions are merely one embodiment of this application, but are not used to limit this application. Any modification, equivalent replacement, or improvement made without departing from the spirit and principle of this application should fall within the protection scope of this application.

What is claimed is:

1. An optical cable connection box, comprising:

a box body;

a pair of adapters, with each adapter of the pair of adapters comprising a first interface and a second interface that are opposite to each other, the pair of adapters are located on substantially opposite sides of the box body, the first interface of the each adapter is located outside the box body, and the second interface of the each adapter is located inside the box body; and a pair of optical fibers are located inside the box body and are cross-connected between second interfaces of each adapter of the pair of adapters.

2. The optical cable connection box according to claim 1, wherein a quantity of optical fibers in the pair of optical fibers is related to a quantity of optical cables connected to the optical cable connection box and a quantity of optical fibers comprised in each optical cable.

3. The optical cable connection box according to claim 1, wherein each adapter is a multi-core adapter, the first interface comprises a plurality of sockets, the second interface comprises a plurality of sockets, and the pair of adapters comprises a first adapter and a second adapter; and a first connector of the pair of optical fibers is inserted into a socket of a second interface of the first adapter, and a second connector of the pair of optical fibers is inserted into a socket of a second interface of the second adapter.

4. The optical cable connection box according to claim 1, wherein the pair of adapters is located on opposing box walls of the box body.

5. The optical cable connection box according to claim 1, wherein a first adapter of the pair of adapters comprises:

a first interface;

a second interface; and a fixing flange;

the first interface and the second interface are of a same structure and the first interface and the second interface are located on both sides of the fixing flange.

6. The optical cable connection box according to claim 5, wherein the adapter is detachable and comprises a first body part and a second body part in an axial direction, and the first body part and the second body part are mounted to form the adapter.

\* \* \* \* \*